US008561936B2

(12) United States Patent
Matte

(10) Patent No.: US 8,561,936 B2
(45) Date of Patent: Oct. 22, 2013

(54) HANG GLIDER ELECTRIC PROPULSION SYSTEM AND METHOD

(76) Inventor: Francois Matte, Quebec (CA)

(*) Notice: Subject to any disclaimer, the term of this patent is extended or adjusted under 35 U.S.C. 154(b) by 205 days.

(21) Appl. No.: 13/010,275

(22) Filed: Jan. 20, 2011

(65) Prior Publication Data

US 2012/0187241 A1 Jul. 26, 2012

(51) Int. Cl.
*B64C 31/024* (2006.01)
*B64C 31/028* (2006.01)

(52) U.S. Cl.
USPC ............................................. 244/16; 244/903

(58) Field of Classification Search
USPC ..................... 244/16, 63, 4 A, 903
See application file for complete search history.

(56) References Cited

U.S. PATENT DOCUMENTS

| 3,204,368 | A | | 9/1965 | Effinger et al. | |
|---|---|---|---|---|---|
| 4,195,801 | A | | 4/1980 | Martin | |
| 4,607,811 | A | * | 8/1986 | Rousseau | 244/63 |
| 4,776,530 | A | | 10/1988 | Mansfield | |
| 4,824,047 | A | * | 4/1989 | Chadwick | 244/16 |
| 5,915,650 | A | | 6/1999 | Petrovich | |
| 2006/0011777 | A1 | * | 1/2006 | Arlton et al. | 244/7 B |
| 2008/0290616 | A1 | * | 11/2008 | Burgess, Jr. | 280/1 |

FOREIGN PATENT DOCUMENTS

| DE | 3403346 A1 | 9/1985 |
|---|---|---|
| EP | 0004965 A1 | 10/1979 |

OTHER PUBLICATIONS

Picture of the Mosquito hang glider, retrieved from "www.mosquitoamerica.com/launch.html" on Jun. 21, 2011.
"The Mosquito Hang Glider power pack" by Joel Letouzey, retrieved from "www.swedishaerosport.se/joel_press.htm" on Jun. 21, 2011.
"ElectraFlyer Triker" brochure, retrieved from "www.electraflyer.com/trike.php" on Jun. 21, 2011.
Merriam Webster Visual Dictionary Online, Hang Glider, http://visual.merriam-webster.com/sports-games/aerial-sports/hang-gliding/hang-glider.php, Viewed 21 Jun. 2013.
Merriam Webster Visual Dictionary Online, Hang Gliding Pilot, http://visual.merriam-webster.com/sports-games/aerial-sports/hang-gliding/hang-gliding-pilot.php, Viewed Jun. 21, 2013.

* cited by examiner

*Primary Examiner* — Tien Dinh
*Assistant Examiner* — Richard R Green
(74) *Attorney, Agent, or Firm* — IPAXIO S.E.N.C.

(57) ABSTRACT

The system includes a keel fitting that can be rigidly attached directly to the keel of the hang glider. It also includes two elongated frame members symmetrically mounted on opposite sides of the keel fitting. At least one electrical motor is mounted on each frame member and there are at least two propellers, each in driving engagement with a corresponding one of the electrical motors. The system further includes an electrical power unit mounted on the back of the pilot. The electrical power unit includes at least one battery and a pilot-actuated control circuit to vary the electrical power supplied to the electrical motors. The system gives the pilot the capability of taking off from a flat terrain. Once airborne, the system is not operated and the hang glider can then be used as an unpowered one.

19 Claims, 8 Drawing Sheets

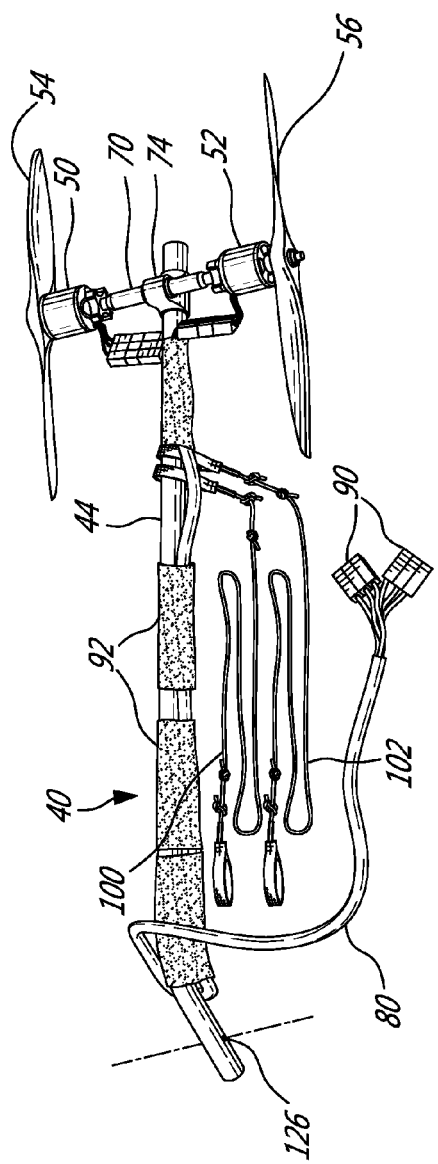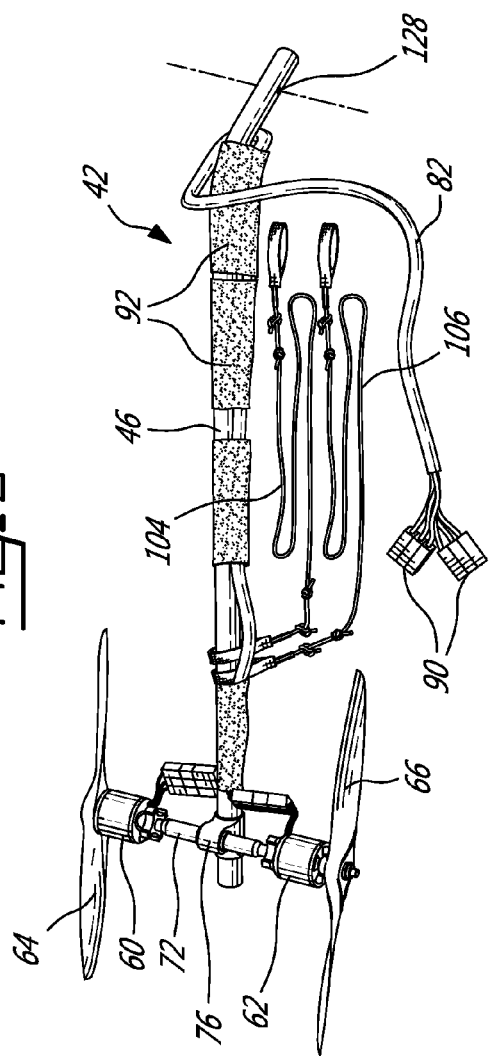

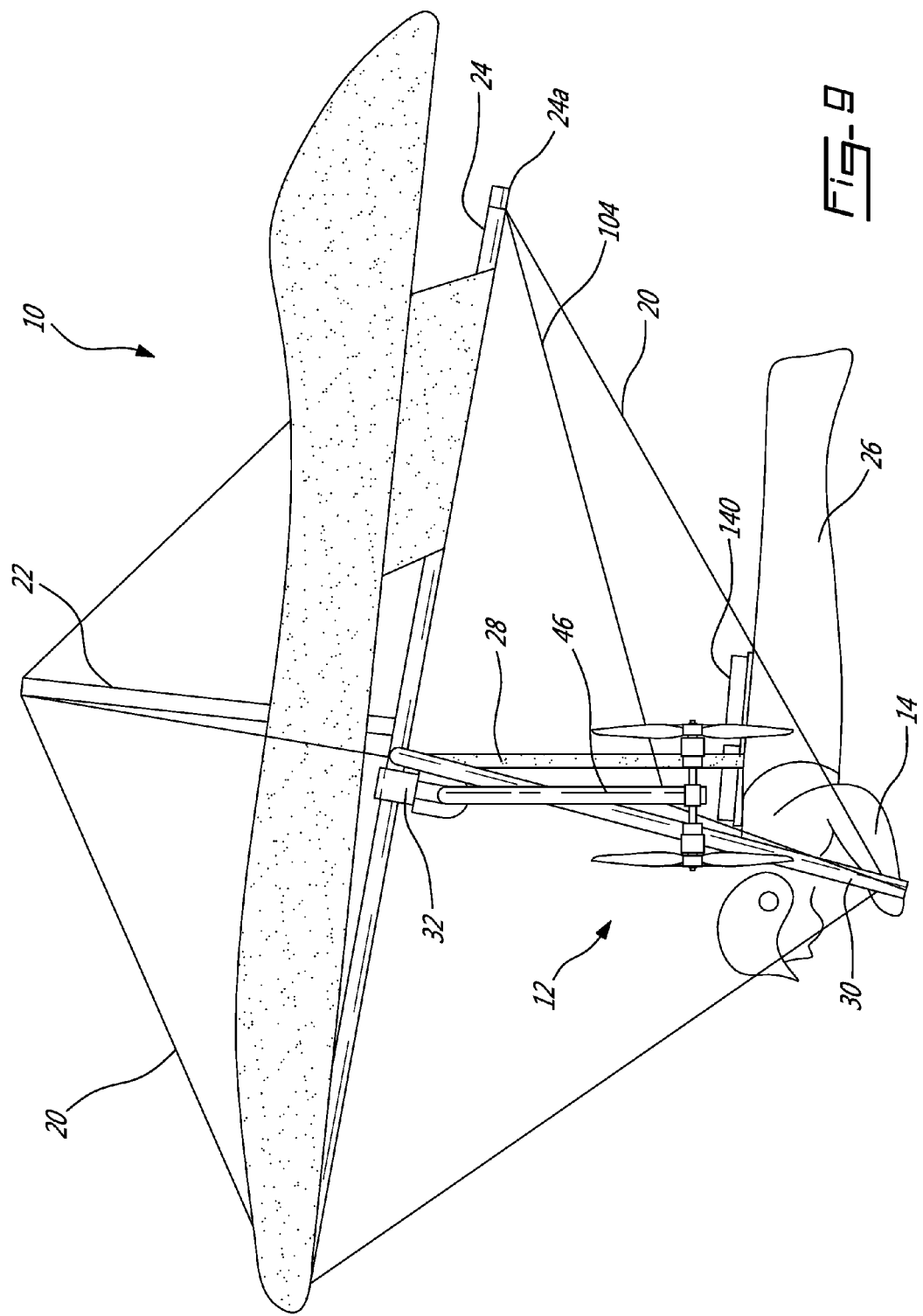

HANG GLIDER ELECTRIC PROPULSION SYSTEM AND METHOD

TECHNICAL FIELD

The technical field relates generally to propulsion arrangements for hang gliders.

BACKGROUND

A hang glider (also known as a delta plane or deltaplane) is a light and foot-launchable aircraft. Most modern hang gliders are made of a lightweight framework covered by a fabric wing. During a flight, the pilot is ensconced in a harness (also called "flight bag") suspended under the wing and exercises control by shifting body weight in opposition to a handheld structure called an "airframe". Most hang gliders are designed to be piloted after takeoff and before landing with the pilot lying in a prone position where the drag is minimized.

Modern hang gliders give pilots the ability to soar and stay airborne for hours using only rising air currents. However, takeoff still requires moving the hang glider up a hill or another elevated location having an open space from which it can be launched to gain the minimum initial airspeed for soaring and then find an ascending air current.

Some arrangements have been proposed over the years to power hang gliders so as to generate enough thrust for taking-off from a flat terrain or the like. Examples of such arrangements can be found in U.S. Pat. No. 4,195,801 issued 1 Apr. 1980 to Martin, and in U.S. Pat. No. 4,607,811 issued 26 Aug. 1986 to Rousseau, to name just a few.

Existing arrangements, however, suffer limitations on different aspects and create additional challenges for both the designers and the pilots. For instance, the added weight of some of these arrangements can require additional efforts from the pilot during takeoff, landing and in flight. It can also reduce the easiness of maneuvering the hang glider compared to an unpowered version. Still, the added weight can significantly modify the location of the center of gravity of the hang glider compared to the original powerless version. In some cases, redesigning the original hang glider may be necessary before providing it with a motor.

Clearly, room for improvements always exists in this area of technology.

SUMMARY

In one aspect, there is provided an electrical propulsion system for a hang glider, the hang glider having a keel under which a pilot is suspended in a prone position while ensconced in a harness during a flight, the keel extending longitudinally along an axis of symmetry of the hang glider, the system including: a keel fitting having a locking mechanism, the locking mechanism including a locked position where the keel fitting is rigidly attached directly to the keel at a location that is substantially coinciding with a center of gravity of the hang glider without the electrical propulsion system mounted therein, and an unlocked position where the keel fitting can be detached from the keel; two elongated frame members symmetrically mounted on opposite sides of the keel fitting, each frame member having a free end that is laterally and downwardly offset with reference to the keel when the keel fitting is rigidly attached to the keel; at least one electrical motor mounted on each frame member; at least two propellers, each in driving engagement with a corresponding one of the electrical motors; and an electrical power unit mounted on the back of the pilot and being electrically connected to the electrical motors, the electrical power unit including at least one battery and a pilot-actuated control circuit to vary the electrical power supplied to the electrical motors by the at least one battery.

In another aspect, there is provided a method of propelling a hang glider, the hang glider having a keel under which a pilot is suspended in a prone position while ensconced in a harness during a flight, the keel extending longitudinally along an axis of symmetry of the hang glider, the method including: removably connecting a keel fitting directly to the keel at a location that is substantially coinciding with a center of gravity of the hang glider; removably connecting a right and a left elongated frame member on a corresponding side of the keel fitting; providing electrical power to at least one electrical motor mounted on each frame member, each electrical motor driving a corresponding propeller using electrical power coming from at least one battery located on a back of the pilot; and varying the electrical power from the at least one battery to the electrical motor using a pilot-actuated control circuit.

Further details on these aspects as well as other aspects of the proposed concept will be apparent from the following detailed description and the appended figures.

BRIEF DESCRIPTION OF THE FIGURES

FIG. 3 is a view illustrating the right lateral unit of the system shown in FIG. 1;

FIG. 4 is a view illustrating the left lateral unit of the system shown in FIG. 1;

FIG. 9 is a side view illustrating the generic hang glider of FIG. 1 during a flight.

DETAILED DESCRIPTION

Figure 1:
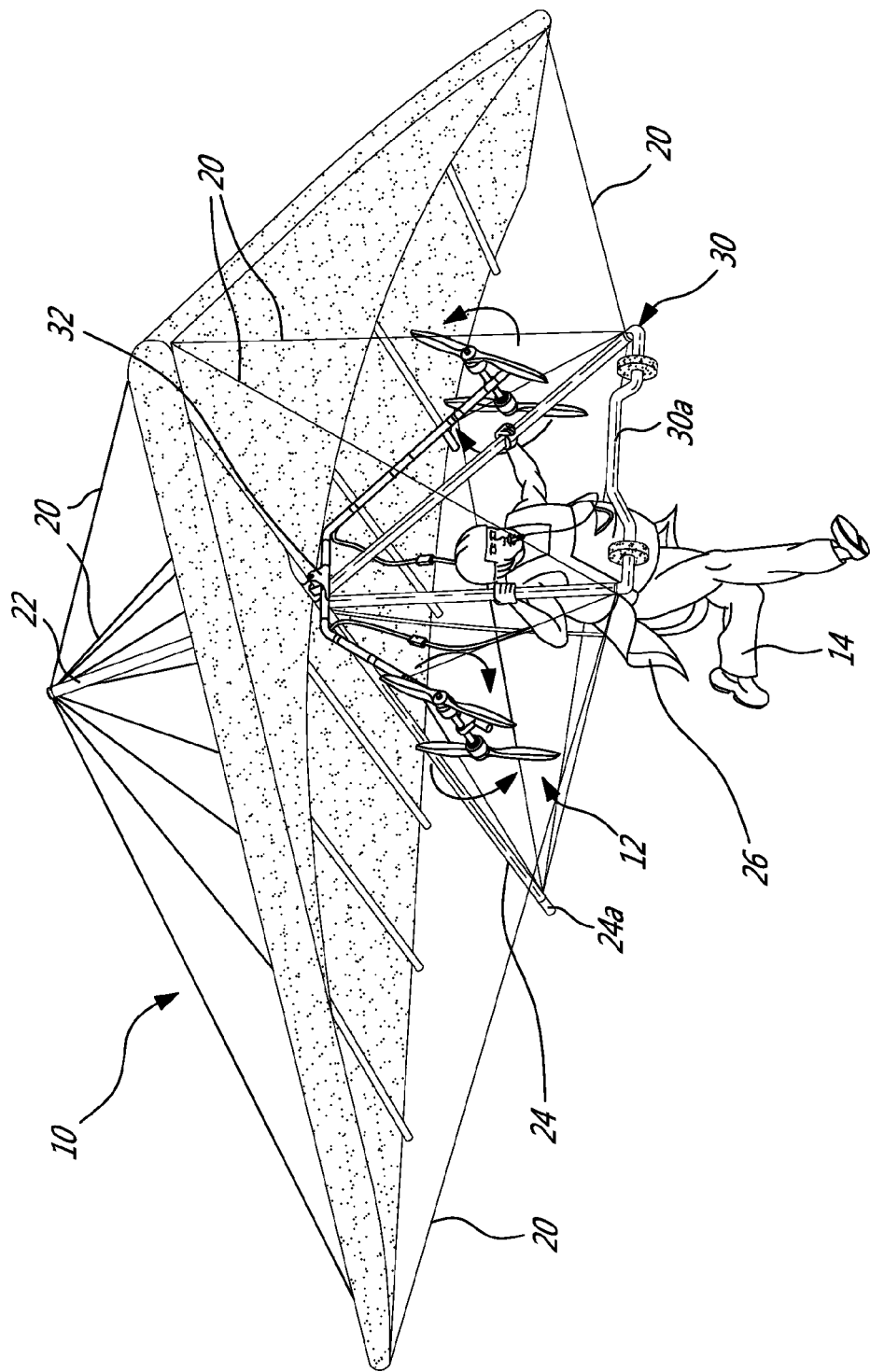
FIG. 1 is an isometric view illustrating an example of a generic hang glider provided with an example of an electrical propulsion system implementing the proposed concept, the hang glider being shown during takeoff.

FIG. 1 is an isometric view illustrating an example of a generic hang glider 10 provided with an example of an electrical propulsion system 12 implementing the proposed concept. FIG. 1 shows the hang glider 10 during takeoff. FIG. 1 shows the pilot 14 supporting by hand the entire weight of the hang glider 10 with the system 12. The pilot 14 runs on the ground to increase the relative airspeed and the system 12 is then at full power to generate enough thrust to further increase this relative airspeed. FIG. 1 shows the hang glider 10 just seconds before takeoff. Thus, the pilot 14 can take off from a flat terrain almost as if he or she would take off from a hill or another elevated location.

After takeoff, the system 12 continues to generate thrust until the hang glider 10 reaches a desired altitude. The system 12 can then be stopped and the hang glider 10 will be used substantially as an unpowered one. If required, the system 12 can be powered on again during the flight if the pilot 14 needs thrust for a particular reason, for instance for ascending if the hang glider 10 cannot gain a desired altitude using air currents only.

The system 12 is capable of being lightweight and versatile. It can be removably mounted to an existing hang glider. It can fit on many different kinds of hang gliders without requiring any modifications to their design.

Figure 2:
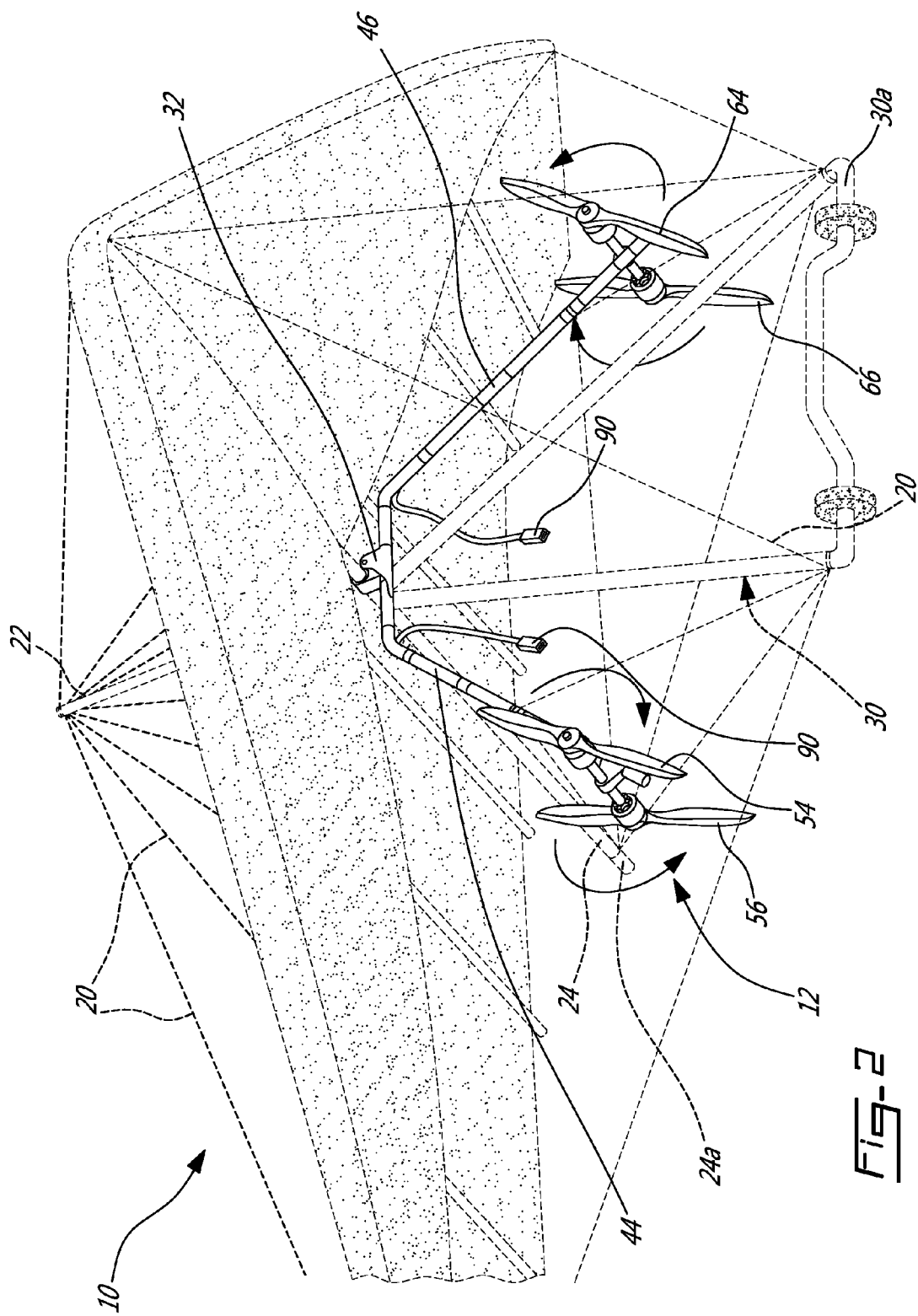
FIG. 2 is an enlarged view of what is shown in FIG. 1 but without the pilot.

FIG. 2 is an enlarged view of what is shown in FIG. 1 but shows the hang glider 10 and the system 12 without the pilot 14. The hang glider 10 is shown in stippled lines for the sake of clarity.

As shown in FIGS. 1 and 2, the generic hang glider 10 has a framework including various tubes or the like over which is provided a fabric to create a wing. Rigging wires 20 are used to reinforce the framework. Some of these rigging wires 20 are connected to a king post 22 projecting upwardly approximately where the center of gravity is located. The framework also includes a keel 24 that is longitudinally extending along an axis of symmetry of the hang glider 10. The keel 24 is used as an attachment point 25 (FIG. 7) for a harness 26 in which the pilot 14 enters after takeoff.

Once airborne, the pilot 14 is ensconced in the harness 26 and is suspended under the keel 24 in a prone position to keep the drag as low as possible. FIG. 9 is a side view illustrating the generic hang glider 10 of FIG. 1 during a flight. The harness 26 is attached to the keel 24 near the center of gravity of the hang glider 10 using one or more supporting straps 28. The pilot 14 controls the hang glider 10 using an airframe 30 also attached to the keel 24 near the center of gravity.

The system 12 includes a keel fitting 32 that is rigidly but removably attached to the keel 24 at a location that is substantially coinciding with the center of gravity of the hang glider 10 without the electrical propulsion system 12 mounted therein. The keel fitting 32 is thus attached very close to where the harness 26 and the airframe 30 are attached to the keel 24.

The keel fitting 32 provides an attachment point to a right and a left lateral unit 40, 42 that are symmetrically disposed on opposite sides of the keel fitting 32. The right and left are with reference to the pilot 14. FIG. 3 illustrates the right lateral unit 40 of the system 12 shown in FIG. 1. FIG. 4 illustrates the left lateral unit 42 of the system 12 shown in FIG. 1.

It should be noted that although the illustrated example shows the keel fitting 32 and the lateral units 40, 42 as parts that can be detached from one another, it is also possible to provide the system 112 as a one-part unit or use a different configuration of detachable parts.

Each lateral unit 40, 42 has a corresponding elongated frame member 44, 46 bearing at least one electrical motor and a corresponding propeller. The right and left lateral units 40, 42 are symmetrical and generate the same thrust.

In the illustrated example, each lateral unit 40, 42 includes two electric motors, each being in driving engagement with a corresponding propeller. The right lateral unit 40 includes two electric motors 50, 52 and two corresponding propellers 54, 56. As shown in FIG. 2, the front propeller 54 on the right side of the pilot 14 rotates in a counterclockwise direction (as viewed from the pilot side) while the rear propeller 56 rotates in a clockwise direction. The counter-rotation counterbalances the torque effect produced by the rotation of each motor-propeller. Likewise, the left lateral unit 42 includes two electric motors 60, 62 and two corresponding propellers 64, 66. The front propeller 64 on the left side of the pilot 14 rotates in a clockwise direction (as viewed from the pilot side) while the rear propeller 66 rotates in a counterclockwise direction. Other arrangements and configurations are possible as well.

As can be seen in FIGS. 3 and 4, the back of the housing of each electric motor 50, 52, 60, 62 is attached to a corresponding tubular support member 70, 72 that is rigidly attached to the corresponding frame member 44, 46 using a coupling 74, 76.

Electrical power is supplied to each electric motor 50, 52, 60, 62 through a corresponding electric cable 80, 82 running parallel to each frame member 44, 46. Each electric cable 80, 82 includes sets of electrical connectors 90 at both ends.

DC motors are used in the illustrated example and each electrical cable 80, 82 includes three wires with three-prong connectors 90 at each end. Each electric cable 80, 82 is attached to the corresponding frame member 44, 46 using a plurality of spaced-apart neoprene sleeves 92 or the like. Other arrangements and configurations are possible as well.

FIGS. 3 and 4 also show rigging wires for the lateral units 40, 42. There are two rigging wires 100, 102 for the right lateral unit 40 and two rigging wires 104, 106 for the left lateral unit 42 in the illustrated example. The free ends of the rigging wires 100, 104 are attached to the trailing end 24a of the keel 24 and the free ends of the rigging wires 102, 106 are attached to the horizontal control bar 30a of the airframe 30. The rigging wires 100, 102, 104, 106 are adjusted in length using knots that can vary the length of a segment thereof. A separate attachment point is used at the trailing end 24a of the keel 24 for each side. Other arrangements and configurations are possible as well. The rigging wires 100, 104 counteract the thrust forces. The rigging wires 102, 106 provide lateral stability.

Figure 5:
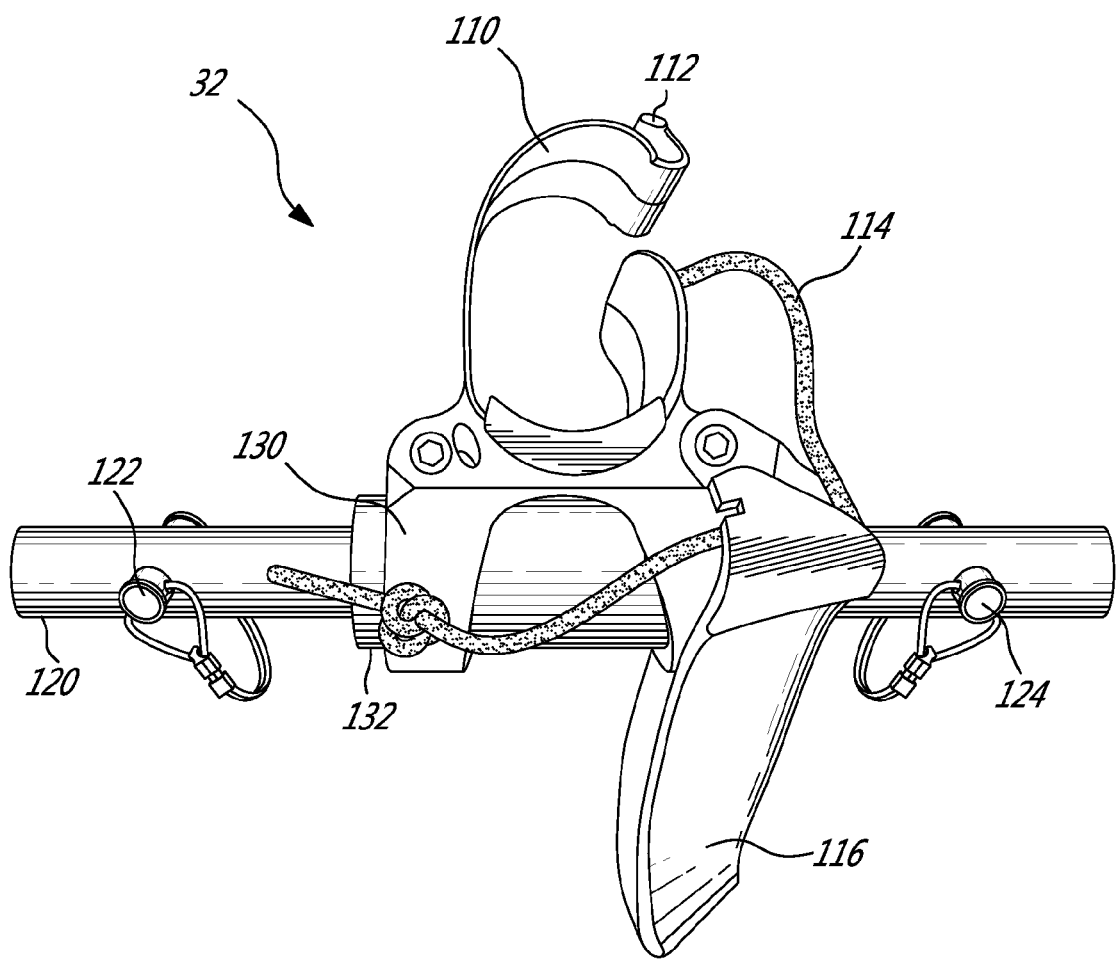
FIG. 5 is an enlarged view illustrating the keel fitting of the system shown in FIG. 1, the keel fitting being in an unlocked position.
Figure 6:
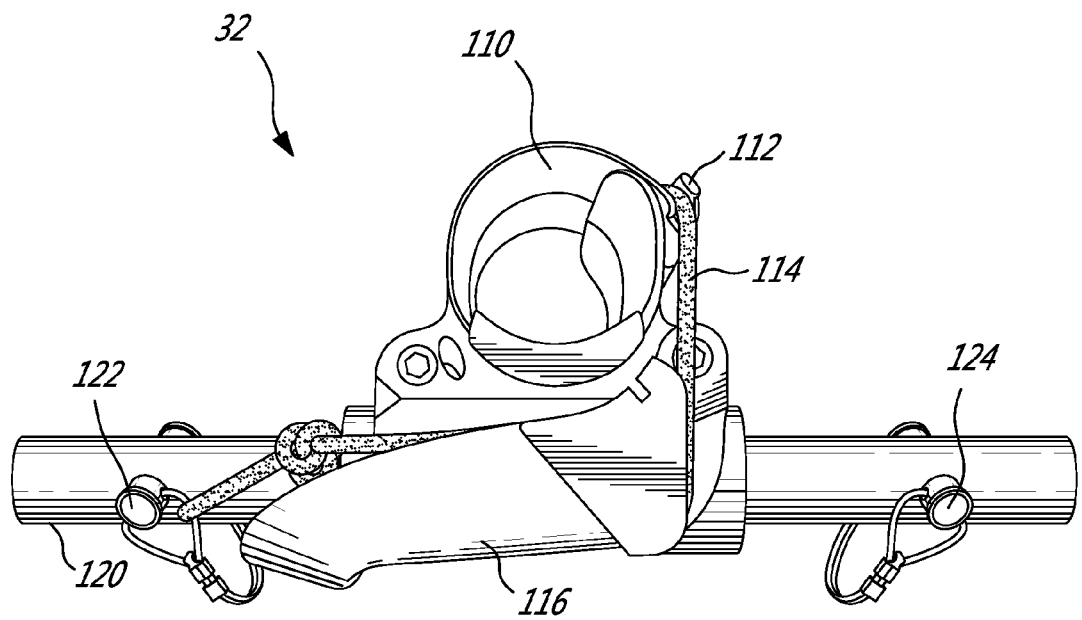
FIG. 6 is a view similar to FIG. 5, with the keel fitting being in a locked position.

FIG. 5 is a view illustrating the keel fitting 32 of the system 12 shown in FIG. 1. The keel fitting 32 can be rigidly attached to the keel 24 of the hang glider 10. The keel fitting 32 is shown with its locking mechanism in an unlocked position in FIG. 5. FIG. 6 is a view similar to FIG. 5 but shows the keel fitting 32 with its locking mechanism in a locked position.

In the illustrated example, the locking mechanism of the keel fitting 32 includes a longitudinally-disposed curved holding member 110. One end of the holding member 110 overlaps the other to form a tube-like part having an internal diameter substantially similar to the external diameter of the keel 24. The overlapping end includes a flange 112 on the outer side thereof. The holding member 110 can be opened to insert it around the keel 24 of the hang glider 10 even if the hang glider 10 is assembled or is about to be fully assembled. A rope 114 is then inserted over the flange 112, as shown in FIG. 5. The rope 114, on both sides of the flange 112, is connected to a lever 116. Moving the lever 116 from the position shown in FIG. 5 to the position of FIG. 6 decreases the diameter of the holding member 110 to create an interfering engagement with the keel 24. The lever 116 is designed so that the tension in the rope 114 keeps the locking mechanism in a closed position unless someone pulls on the lever 116 to open it on purpose. It should be noted that the locking mechanism is similar to a wishbone attachment that can be found on some windsurfs. Other configurations and arrangements are possible.

In the illustrated example, the keel fitting 32 includes a transversal tube 120 having two opposite ends. Each end can fit into the inner end of a corresponding one of the elongated frame members 44, 46. Locking pins 122, 124 are inserted through corresponding holes once the holes are in registry on each of the sides. The holes 126, 128 of the frame members 44, 46 are shown in FIGS. 3 and 4. The transversal tube 120 is snugly mounted into an outer tube 132 mounted inside the base 130 of the keel fitting 32. The friction between the transversal tube 120 and the outer tube 132 provides some resistance to the rotation movement but still allows the transversal tube 120 to be pivoted around a transversal rotation axis. This way, the angle of the rotation axes of the propellers 54, 56, 64, 66 with reference to the keel 24 can be modified by adjusting the length of the rigging wires 100, 102, 104, 106 attached from the frame members 44, 46 to the rear end 24a of the keel 24 and from the frame members 44, 46 to the lower corners of the airframe 30. The optimum angle will generally depend on the type of wing and also on other parameters.

Figure 7:
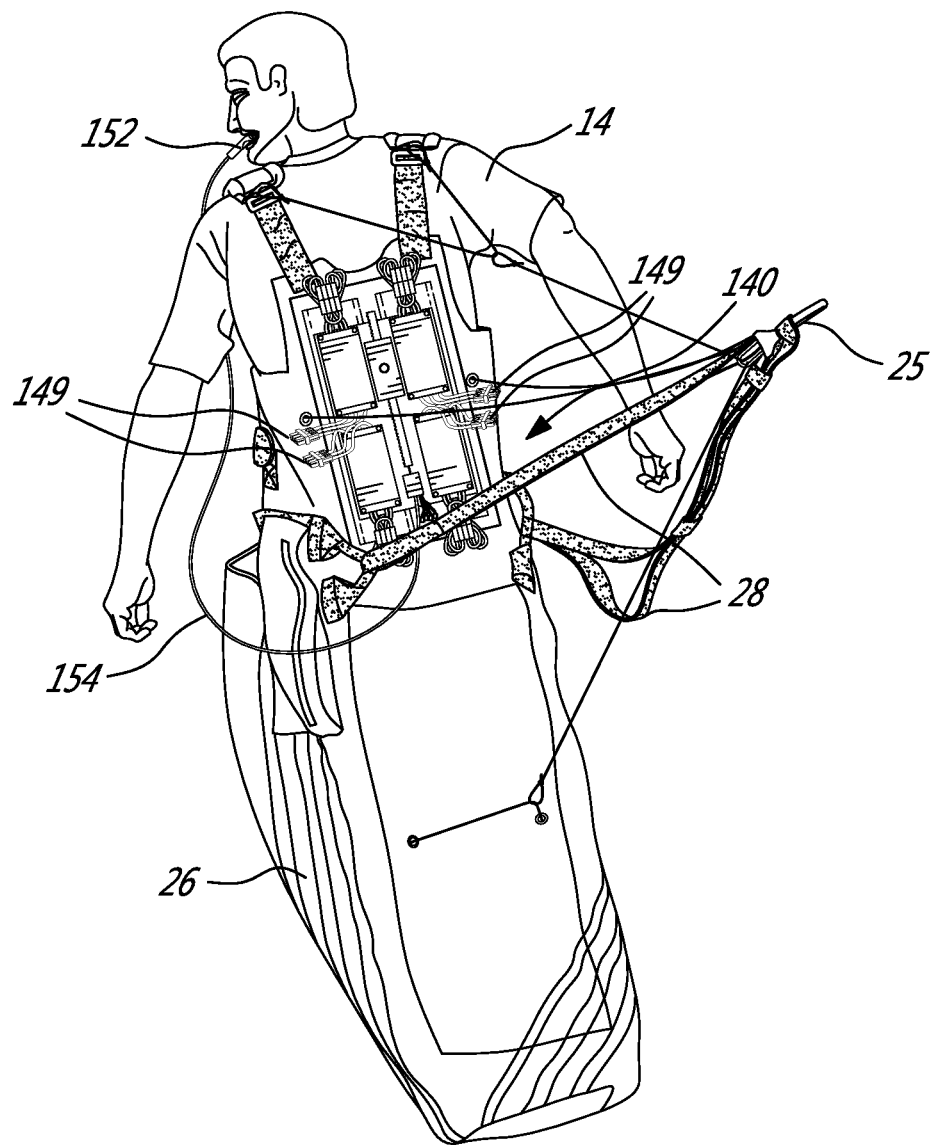
FIG. 7 is rear isometric view illustrating the harness and the electrical power unit used in the system shown in FIG. 1.

FIG. 7 is a rear isometric view illustrating the harness 26 and an electrical power unit 140 used in the system 12 shown in FIG. 1. This electrical power unit 140 includes a plurality of batteries and a plurality of power controllers to manage the power from the batteries. FIG. 7 also shows the electrical power unit 140 mounted on the back of the pilot 14. It is thus very close to the back of the pilot 14. This feature will minimize the impact of the added weight. The electrical power unit 140 is connected to the harness 26 by Velcro®.

It should be noted that the design of the electrical power unit 140 can be adapted to different types of harnesses. For instance, some harnesses include a single supporting strap. The electrical power unit 140 can thus have another configuration, for instance a U-shaped configuration or an O-shaped configuration, for use with a single supporting strap. Other configurations and arrangements are possible.

Figure 8:
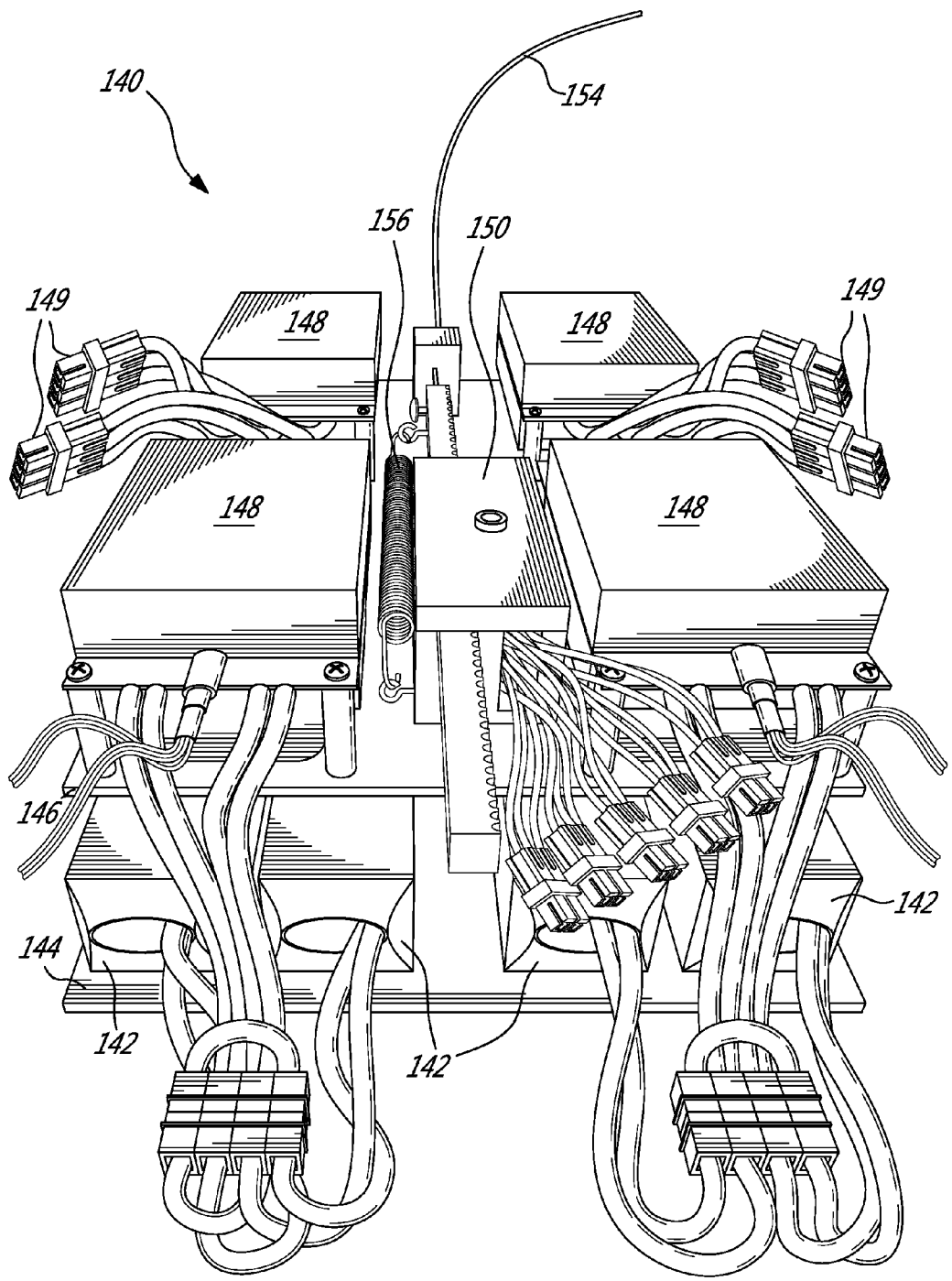
FIG. 8 is a rear isometric view of the electrical power unit of FIG. 7.

FIG. 8 is a rear isometric view illustrating the electrical power unit 140 of FIG. 7. The electrical power unit 140 includes at least one battery 142. In the illustrated example, the electrical power unit 140 includes eight batteries 142, four of them being visible in FIG. 8. The batteries 142 are symmetrically disposed between two superimposed plates 144, 146, for instance aluminum plates. Two batteries 142 are provided in series for each electrical motor 50, 52, 60, 62. There are thus four batteries 142 for the left side and four for the right side.

There is at least one power controller 148 in the system 12. In the illustrated example, each pair of batteries 142 is connected to one power controller 148 using corresponding wires and connectors. The power controllers 148 are mounted on the second aluminum plate 146. They are also calibrated before flight so as to equalize the power supplied to the various electrical motors 50, 52, 60, 62. This way, the same thrust can be generated on both sides. The connectors 90 for the cables 80, 82 are connected to the connectors 149 at the center. Other configurations and arrangements are possible.

Also in the illustrated example, the electrical power unit 140 includes a pilot-actuated control unit 150 to vary the electrical power supplied to the electrical motors 50, 52, 60, 62. The pilot 14 uses a mouth-throttle 152 (FIG. 7) in order to have both hands free for proper weight-shift control during takeoff, flight and landing maneuvers. The commands from the mouth-throttle 152 are mechanically transferred to the control unit 150 by a corresponding sheathed wire 154. The control unit 150 includes a return spring 156 (FIG. 8) for the sheathed wire 154. It sends command signals to the power controllers 148 in response to the position of the mouth-throttle 152. The mouth-throttle 152 can have a stroke of about 25 mm to vary the power between 0 and 100%. Other configurations and arrangements are possible as well.

If desired, propeller guards (not shown) can be provided to prevent the pilot 14 from contacting the propellers 54, 56, 64, 66.

As can be appreciated, the proposed concept also provides a method of propelling a hang glider 10. The method includes:

removably connecting a keel fitting 32 directly to the keel 24 at a location that is substantially coinciding with a center of gravity of the hang glider 10;

removably connecting a right and a left elongated frame men 44, 46 on a corresponding side of the keel fitting 32;

providing electrical power to at least one electrical motor 50, 52, 60, 62 mounted on each frame member 44, 46, each electrical motor 50, 52, 60, 62 driving a corresponding propeller 54, 56, 64, 66 using electrical power coming from at least one battery 142 located on a back of the pilot; and varying the electrical power from the at least one battery 142 to the electrical motor 50, 52, 60, 62 using a pilot-actuated control circuit 150.

EXAMPLE

An example of a system using the proposed concept was tested. The system was similar to the system 12 shown in the figures. The system 12 included two DC electrical motors on each side, thus four in total, with counter-rotating propellers. The keel fitting 32 and the two lateral units 40, 42 (including the electrical motors 50, 52, 60, 62 and the propellers 54, 56, 64, 66) weighted about 6.8 kg (15 pounds). The system 12 was designed to product about 20 kg (45 pounds) of static thrust on each side at full throttle. At full throttle, the supplied power at each electrical motor 50, 52, 60, 62 was about 50 A at about 40 Volts. Eight 18.5V batteries 142 were used with four power controllers 148. The electrical power unit 140 weighted about 9.0 kg (20 pounds). With a full initial charge, the system 12 had about 5 minutes of autonomy at full throttle. However, it only needed to operate for about 60 seconds for the hang glider 10 to takeoff from a flat terrain or the like and soar.

The present detailed description and the appended figures are meant to be exemplary only, and a skilled person will recognize that variants can be made in light of a review of the present disclosure without departing from the proposed concept. For instance, the materials specified in the detailed description are only examples. Other variants are also possible as well.

What is claimed is:

1. An electrical propulsion system for a hang glider, the hang glider having a keel under which a pilot is suspended in a prone position while ensconced in a harness during a flight, the keel extending longitudinally along an axis of symmetry of the hang glider, the system including:

a keel fitting having a locking mechanism, the locking mechanism including a locked position where the keel fitting is rigidly attached directly to the keel at a location that is substantially coinciding with a center of gravity of the hang glider without the electrical propulsion system mounted therein, and an unlocked position where the keel fitting can be detached from the keel;

two elongated frame members symmetrically mounted on opposite sides of the keel fitting, each frame member having a free end that is laterally and downwardly offset with reference to the keel when the keel fitting is rigidly attached to the keel;

at least one electrical motor mounted on each frame member;

at least two propellers, each in driving engagement with a corresponding one of the electrical motors; and an electrical power unit adapted to be mounted on the back of the pilot and being electrically connected to the electrical motors, the electrical power unit including at least one battery and a pilot-actuated control circuit to vary the electrical power supplied to the electrical motors by the at least one battery.

2. The system as defined in claim 1, wherein the electrical power unit includes a mouth-throttle mechanically connected to a control circuit.

3. The system as defined in claim 1, wherein on each frame member, two independent and coaxially-disposed electrical motors are provided, each electrical motor driving a corresponding one of the propellers.

4. The system as defined in claim 1, wherein the electrical power unit includes at least one battery for each electrical motor.

5. The system as defined in claim 1, wherein the electrical power unit includes a power controller, one for each electrical motor.

6. The system as defined in claim 1, wherein the locking mechanism of the keel fitting includes a lever selectively moving a longitudinally-disposed curved holding member in and out of interfering engagement with an outer surface of the keel.

7. The system as defined in claim 1, wherein the keel fitting includes a transversal tube to which a corresponding end of the opposite frame members are removably connected.

8. The system as defined in claim 7, wherein the transversal tube is pivotally mounted in the keel fitting.

9. The system as defined in claim 8, further including two sets of rigging wires, each set of rigging wires including one rigging wire having one end attached to a corresponding one of the frame members and a second end attached to a trailing end of the keel.

10. The system as defined in claim 9, wherein each rigging wire attached between one of the frame members and the trailing end of the keel is adjustable in length.

11. A method of propelling a hang glider, the hang glider having a keel under which a pilot is suspended in a prone position while ensconced in a harness during a flight, the keel extending longitudinally along an axis of symmetry of the hang glider, the method including:

removably connecting a keel fitting directly to the keel at a location that is substantially coinciding with a center of gravity of the hang glider;

removably connecting a right and a left elongated frame member on a corresponding side of the keel fitting;

providing electrical power to at least one electrical motor mounted on each frame member, each electrical motor driving a corresponding propeller using electrical power coming from at least one battery adapted to be located on a back of the pilot; and varying the electrical power from the at least one battery to the electrical motor using a pilot-actuated control circuit.

12. The method as defined in claim 11, wherein varying the electrical power using the pilot-actuated control circuit includes using a mouth-throttle.

13. The method as defined in claim 11, wherein providing electrical power to the at least one electrical motor mounted on each frame member includes calibrating the thrust generated on the right and the left frame member.

14. The method as defined in claim 11, wherein providing electrical power to the at least one electrical motor mounted on each frame member includes providing power to two independent and coaxially-disposed electrical motors, one being a front electrical motor driving a front propeller and the other being a rear electrical motor driving a rear propeller.

15. The method as defined in claim 14, wherein the front propeller and the rear propeller are, on each frame member, rotating in opposite directions.

16. The method as defined in claim 15, wherein the front propeller of the right frame member and the front propeller of the left frame member are rotating in opposite directions.

17. The method as defined in claim 11, further including: taking off from a substantially flat terrain.

18. The method as defined in claim 17, further including: immediately prior to takeoff, having the pilot supporting the entire weight of the hang glider and running on foot to gain airspeed.

19. The method as defined in claim 11, further including: once airborne, interrupting the electrical power to the electrical motors and using the hang glider as an unpowered one.

* * * * *